(12) United States Patent  (10) Patent No.: US 7,831,554 B2
Schreter et al. (45) Date of Patent: Nov. 9, 2010

(54) MOBILE DATA MANAGEMENT USING ASSOCIATION TABLE

(75) Inventors: Ivan Schreter, Leimen (DE); Hans-Martin Ludwig, Wiesloch (DE)

(73) Assignee: SAP AG, Walldorf (DE)

( * ) Notice: Subject to any disclaimer, the term of this patent is extended or adjusted under 35 U.S.C. 154(b) by 1470 days.

(21) Appl. No.: 11/215,871

(22) Filed: Aug. 31, 2005

(65) Prior Publication Data
US 2007/0049246 A1    Mar. 1, 2007

(51) Int. Cl.
G06F 17/30    (2006.01)
(52) U.S. Cl. .................. 707/621; 455/502
(58) Field of Classification Search ............ 707/610, 707/621, 999.107, 999.201; 455/502
See application file for complete search history.

(56) References Cited

U.S. PATENT DOCUMENTS

| | | | |
|---|---|---|---|
| 6,360,101 B1* | 3/2002 | Irvin ................ | 455/456.6 |
| 6,487,560 B1* | 11/2002 | LaRue et al. ................ | 1/1 |
| 2002/0032613 A1* | 3/2002 | Buettgenbach et al. ........ | 705/26 |
| 2002/0103724 A1* | 8/2002 | Huxter ................ | 705/28 |
| 2003/0115162 A1* | 6/2003 | Konick ................ | 705/404 |
| 2004/0254985 A1* | 12/2004 | Horstemeyer ................ | 709/205 |
| 2006/0020366 A1* | 1/2006 | Bloom ................ | 700/226 |
| 2006/0193264 A1* | 8/2006 | Bonar et al. ................ | 370/252 |
| 2006/0235739 A1* | 10/2006 | Levis et al. ................ | 705/9 |
| 2008/0046326 A1* | 2/2008 | Horstemeyer ................ | 705/14 |

FOREIGN PATENT DOCUMENTS

| | | |
|---|---|---|
| CA | 2 476 156 A1 | 1/2005 |
| EP | 0 909 069 A2 | 4/1999 |
| WO | WO 02/054236 A2 | 7/2002 |

OTHER PUBLICATIONS

Developers Sun Corn: "Core J2EE Patterns—Transfer Object", Internet Citation, [Online} 2004, XP002403968. Retrieved from the Internet: URL:http://web.archive.org/web/20040203074520/java.sun.com/blueprints/corej2eepatterns/Patterns/TransferObject.html>[retrieved on Oct. 20, 2006] 15 pgs.
"European Search Report of the European Patent Office", mailed Oct. 31, 2006, for EP 06018141.9, 7pgs.

* cited by examiner

*Primary Examiner*—Leslie Wong
(74) *Attorney, Agent, or Firm*—Buckley, Maschoff & Talwalkar LLC

(57) ABSTRACT

Middleware for mobile data management may include an association table and a message store. The middleware may operate to receive a business object instance from a backend system, determine one or more mobile devices associated with the business object instance, associate the business object instance with the one or more mobile devices and with an insert state in an association table, and associate, in the association table, the business object instance and the one or more mobile devices with a full-state message in the message store.

24 Claims, 19 Drawing Sheets

1305

| Device ID | BO Instance ID | Operation | Delta |
|---|---|---|---|
| D1 | I1 | Current | |
| D1 | I2 | Insert | |
| D1 | I3 | Current | |
| D1 | I4 | Current | |
| D2 | I1 | Insert | |
| D2 | I3 | Current | |
| D2 | I4 | Update | A=1 |

| Device ID | BO Instance ID | Operation | Delta |
|---|---|---|---|
| D1 | I1 | Current | |
| D1 | I2 | Insert | (no change) |
| D1 | I3 | Update | B=2 |
| D1 | I4 | Update | C=5 |
| D2 | I1 | Insert | |
| D2 | I3 | Update | B=2 |
| D2 | I4 | Update | A=1, C=5 |

FIG. 8B

| Device ID | BO Instance ID | Operation | Missing Flag |
|---|---|---|---|
| D1 | I1 | Current | False |
| D1 | I2 | Update | False |
| D1 | I3 | Current | False |
| D1 | I4 | Insert | False |
| D1 | I5 | Insert | False |
| D1 | I6 | Current | False |
| D1 | I7 | Remove | False |
| D1 | I8 | Insert | False |
| D1 | I9 | Current | False |

FIG. 10

Messages Sent to Device D1:

- Insert I4
- Insert I5
- Insert I8
- Update I2
- Remove I7

| Device ID | BO Instance ID | Operation | Missing Flag |
|---|---|---|---|
| D1 | I1 | Current | False |
| D1 | I2 | Current | False |
| D1 | I3 | Current | False |
| D1 | I4 | Current | False |
| D1 | I5 | Current | False |
| D1 | I6 | Current | False |
|  |  |  |  |
| D1 | I8 | Current | False |
| D1 | I9 | Current | False |

1305 →

| Device ID | BO Instance ID | Operation | Missing Flag |
|---|---|---|---|
| D1 | I1 | Current | False |
| D1 | I2 | Current | False |
| D1 | I3 | Current | False |
| D2 | I4 | Insert | False |
| D2 | I5 | Current | False |

| Device ID | BO Instance ID | Operation | Missing Flag |
|---|---|---|---|
| D1 | I1 | Current | False |
| D1 | I2 | Current | False |
| D1 | I3 | Current | False |
| D2 | I4 | Current | False |
| D2 | I5 | Current | True |

| Device ID | BO Instance ID | Operation |
|---|---|---|
| D1 | I1 | Insert |
| D1 | I2 | Insert |
| D1 | I3 | Insert |
| D1 | I4 | Insert |
| D1 | I5 | Insert |
| D1 | I6 | Insert |
|  |  |  |
| D1 | I8 | Insert |
|  |  |  |

| Device ID | BO Instance ID | Operation |
|---|---|---|
| D1 | I1 | Current |
| D1 | I2 | Current |
| D1 | I3 | Current |
| D1 | I4 | Insert |
| D1 | I5 | Insert |
| D1 | I6 | Update |
| D1 | I7 | Remove |
| D1 | I8 | Update |
| D1 | I9 | Remove |

| Device ID | BO Instance ID | Operation | Delta |
|---|---|---|---|
| D1 | O1 | Insert | 1 |
| D2 | O1 | Update | 3 |
| D3 | O1 | Current | (null) |
| D4 | O1 | Update | 4 |
| D5 | O1 | Update | 4 |
| ⋮ | ⋮ | ⋮ | ⋮ |
| D1 | O2 | | |

| MsgID | MsgText | BkRef |
|---|---|---|
| 1 | O1: (2,2,2,4) | (null) |
| 2 | O1: C=2 | x |
| 3 | O1: A=2 | x |
| 4 | O1: A=2, C=2 | 2 |
| 5 | | |
| 6 | | |
| 7 | | |
| 8 | | |

| Device ID | BO Instance ID | Operation | Delta |
|---|---|---|---|
| D1 | O1 | Insert | 6 |
| D2 | O1 | Update | 7 |
| D3 | O1 | Update | 5 |
| D4 | O1 | Update | 8 |
| D5 | O1 | Update | 8 |
| ... | ... | ... | ... |
| D1 | O2 | ... | ... |

FIG. 19A — 1308

| MsgID | MsgText | BkRef |
|---|---|---|
| 1 | O1: (2,2,2,4) | (null) |
| 2 | O1: C=2 | x |
| 3 | O1: A=2 | x |
| 4 | O1: A=2, C=2 | 2 |
| 5 | O1: B=4 | 1 |
| 6 | O1: (2,4,2,4) | (null) |
| 7 | O1: A=2, B=4 | 3 |
| 8 | O1: A=2, C=2, B=4 | 4 |

US 7,831,554 B2

MOBILE DATA MANAGEMENT USING ASSOCIATION TABLE

FIELD

Some embodiments relate to enterprise systems utilizing occasionally-connected mobile devices. In particular, some embodiments are concerned with the management and consistency of business data within such systems.

BACKGROUND

Middleware may be used to provide functions to an enterprise. Middleware generally facilitates access to business data within a back-end system by an end-user of such data. More specifically, middleware may perform administrative functions such as conflict checking, integrity checking, and synchronization. These administrative functions may ensure consistency and accessibility of business data throughout the enterprise.

An end-user of business data may interact with the enterprise via a mobile device. In one example, a delivery person may deliver a product to customers along an established route. The delivery person may use a mobile device to determine a product quantity and delivery schedule for each customer on the route, to enter new orders and/or changes to existing orders, and to indicate successful delivery of an order. The mobile device must therefore receive business data from a back-end system that is specific to the route with which the mobile device is associated (e.g., product quantities, delivery schedules). The mobile device must also be able to transmit business data (e.g., new and/or changed order information) to the back-end system for validation and storage therein. Each of these functions may require conflict checking and integrity checking as described above.

The synchronization of business data between a mobile device and a back-end system presents issues that may not arise in a non-mobile context. Primarily, mobile devices might not be continuously connected to their associated back-end systems. It may therefore be more difficult to keep mobile devices up-to-date with respect to their associated data, and to maintain accurate knowledge of the internal state of the mobile devices.

Conventional "replication and realignment" middleware for addressing the foregoing may use a store-and-forward approach in which each message intended for each mobile device is queued as it is received from a back-end system. This approach may require an undesirably large amount of message storage. Bandwidth and processing inefficiencies may also result from this approach because earlier-queued messages are stored-and-forwarded to an associated mobile device even if the earlier-queued messages are rendered unnecessary by later-queued messages. Alternatively, a connect-and-compute approach requires middleware to compute appropriate synchronization messages only after a mobile device is connected thereto.

Improvements to the efficiency of mobile middleware are therefore desired. Moreover, mobile middleware is desired that may provide increased control and/or more robust management of business data than currently available.

BRIEF DESCRIPTION OF THE DRAWINGS

FIGS. 8A and B comprise tabular representations of a portion of an association table data structure to illustrate updating an association table data structure according to some embodiments.

FIG. 10 is a tabular representation of a portion of an association table data structure to illustrate device synchronization according to some embodiments.

FIG. 11 is a tabular representation of a portion of an association table data structure to illustrate device synchronization according to some embodiments.

FIGS. 14A and 14B comprise tabular representations of portions of respective association table data structures to illustrate referential integrity and synchronization completeness checks according to some embodiments.

FIGS. 16A and 16B comprise tabular representations of a portion of an association table data structure to illustrate regeneration of data on a mobile device according to some embodiments.

FIGS. 18A and 18B comprise tabular representations of a portion of a message store and an association table data structure, respectively, to illustrate message store optimization according to some embodiments.

FIGS. 19A and 19B comprise tabular representations of a portion of a message store and an association table data structure, respectively, to illustrate message store optimization according to some embodiments.

DETAILED DESCRIPTION

Figure 1:
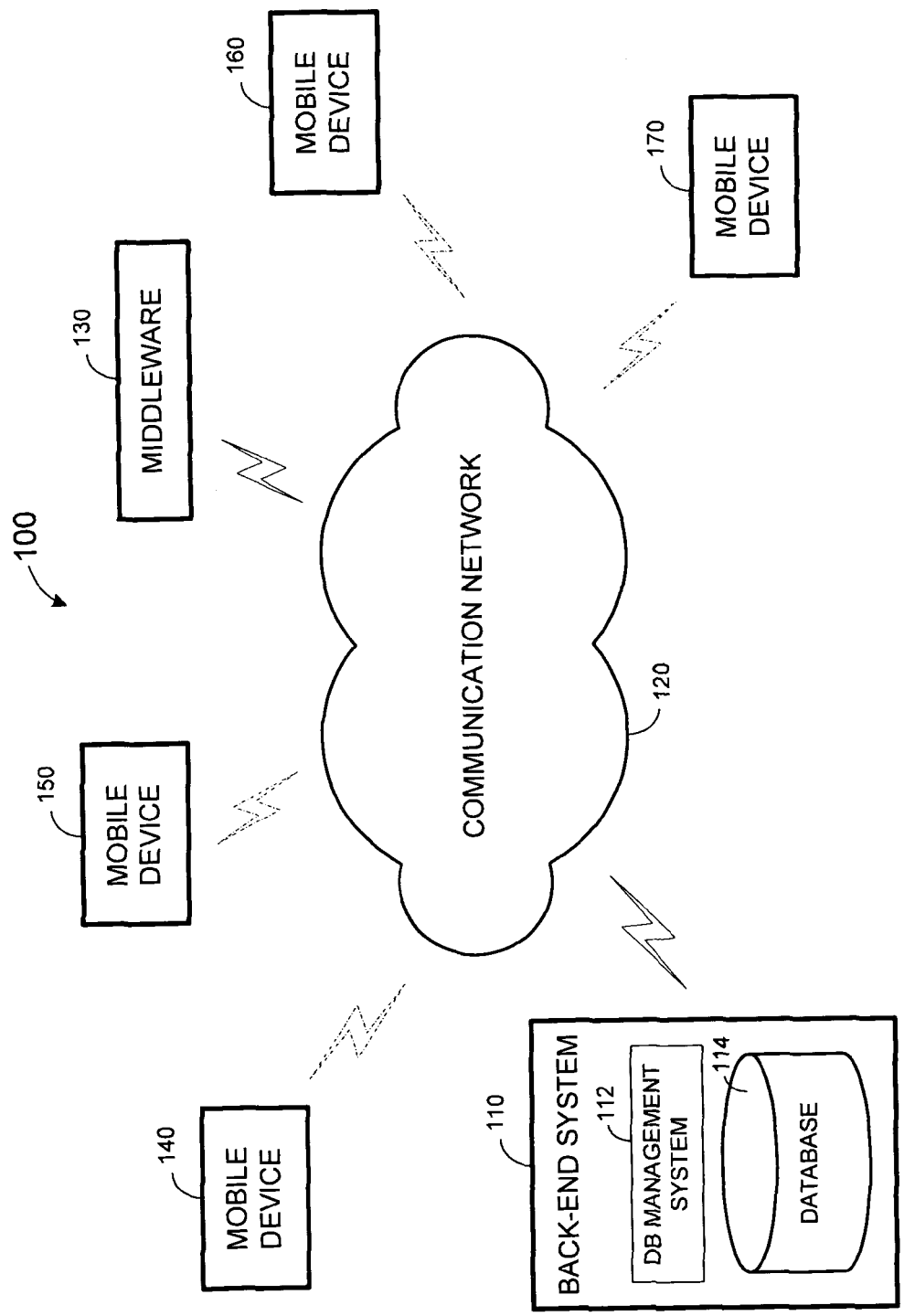
FIG. 1 is a block diagram of a system topology according to some embodiments.

FIG. 1 illustrates a topology of enterprise system 100 according to some embodiments. System 100 may, for example, provide management of business data among disparate and occasionally-connected mobile devices. System 100 includes back-end system 111 in communication with communication network 120. Also in communication with communication network 120 are middleware 130 and mobile devices 140 through 160.

Back-end system 110 of FIG. 1 includes database management system (DBMS) 112 and database 114. DBMS 112 may comprise executable program code to retrieve data from database 114. Database 114 may comprise one or more disparate systems for storing data, therefore DBMS 112 may comprise one or more systems for retrieving stored data. According to some embodiments, database 114 is implemented as any suitable collection of data that may be accessed by a computer program to select particular data from the collection. Back-end system 110 may comprise other unshown elements to provide an enterprise system such as SAP R/3™ Enterprise Resource Planning system.

Back-end system 110 may also comprise any other suitable program code, scripts, or other functional data that is executable to interface with communication network 120 and middleware 130 as described herein. Back-end system 110 may comprise any combination of hardware, software, and/or firmware elements that may provide the functions that are attributed to a back-end system herein. Two or more of these elements may be located remotely from one another and may communicate with one another via communication network 120 and/or a dedicated connection.

As used herein, systems "in communication" with one another are directly or indirectly capable of communicating over any number of different systems for transferring data, including but not limited to a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP). Communication network 120 may therefore comprise any communication media and protocols that are or become known.

Middleware 130 may comprise any combination of hardware, software, and/or firmware elements suitable to provide the functions that are attributed herein to middleware. In some embodiments, middleware 130 comprises program code running in an environment provided by back-end system 110. Middleware 130 may be embodied as services, layers, and/or core components of an associated operating environment, and/or may be embodied by any other executable software component, including a dynamic link library or a stand-alone application.

According to some embodiments, middleware 130 provides an association table and a message store, each of which will be described in detail below. As will also be described below, middleware 130 may operate to receive a business object instance from a backend system, determine one or more mobile devices associated with the business object instance, associate the business object instance with the one or more mobile devices and with an insert state in the association table, and associate, in the association table, the business object instance and the one or more mobile devices with a full-state message in the message store. Such features may provide more efficient management of business data among mobile devices than previously available.

Mobile devices 140 through 170 are associated with business objects transmitted by back-end system 110. Continuing with the example from the Background, a business object (BO) may comprise an order placed by a customer and may therefore be associated with the one of mobile devices 140 through 170 that is assigned to a delivery route to which that customer belongs. According to some embodiments, middleware 130 is responsible for transmitting an instance of the BO, as well as updates thereto, the appropriate one of mobile devices 140 through 170.

Mobile devices 140 through 170 may comprise any of a laptop, a personal digital assistant, a tablet computer, a handheld computer, a cellular telephone, a dedicated mobile device, and any other suitable mobile device or devices that are or become known. As mentioned above, mobile devices 140 through 170 may occasionally connect to middleware 130 directly or via communication network 120.

Figure 2:
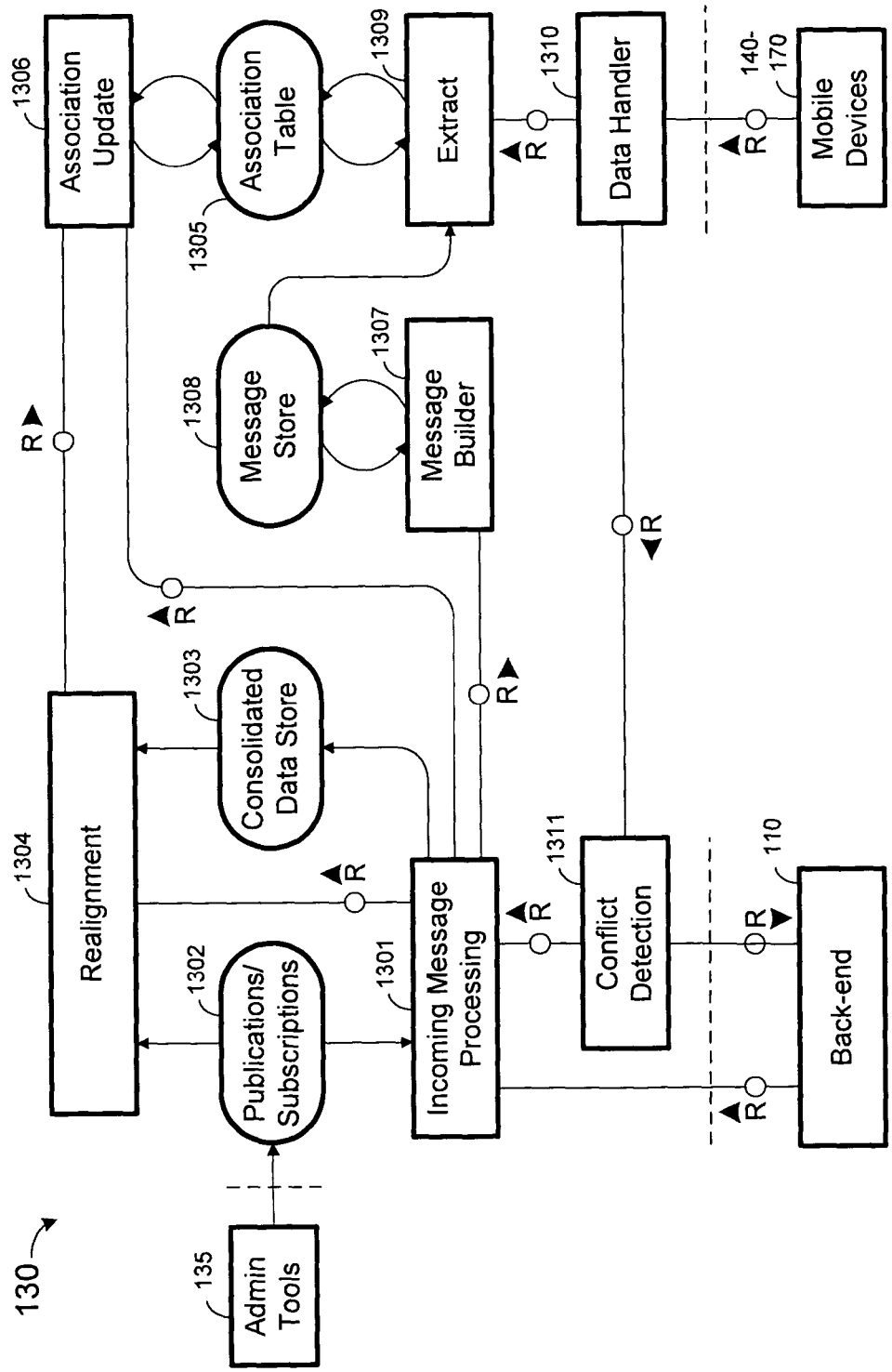
FIG. 2 is a block diagram of a middleware software architecture according to some embodiments.

FIG. 2 illustrates a software architecture of middleware 130 according to some embodiments. Middleware 130 is not limited to the illustrated architecture, and the architecture itself may be implemented in any currently- or hereafter-known manner.

Incoming message processing module 1301 is shown receiving messages from back-end 110. These messages may be received from back-end 110 via communication network 120. Such messages may include instructions to insert a BO instance, to update a BO instance, to remove a BO instance, and/or to perform any other functions attributed to middleware 130 herein.

Incoming message processing module 130 uses publications/subscriptions data 1302 to identify one or more mobile devices with which an incoming BO instance should be associated. Such publications and subscriptions may follow a conventional model, in which a publication is a set of criteria fields on a BO instance with operations that can be used for filtering data for a particular receiver (e.g., country+ZIP code), and a subscription is a specific set of values for the criteria fields of a publication (e.g., USA+[45000-45999]) that are associated with one or more receivers to determine a set of receivers for a BO instance.

Admin tools 135 may be used to edit publications/subscriptions data 1302. In this regard, middleware 130 may offer a suitable interface (e.g., https, etc.) to allow secure manipulation of publications/subscriptions data 1302 by an authorized user.

Consolidated data store 1303 receives the BO instance from module 1301 to create a replica of relevant BO data from back-end system 110. The replica may be used by realignment module 1304 to replicate and realign the BO data as will be described below. Generally, realignment module 1304 updates association table 1305 through association update module 1306 to associate BO instances in data store 1303 (e.g., via a BO ID) with devices (e.g., via a device ID).

Incoming message processing module 1301 may also instruct message builder 1307 to build a full-state message or an update message based on the received BO instance. The thus-built message is stored in message store 1308. The messages of message store 1308 may be transmitted to appropriate mobile devices during synchronization and based on information located in association table 1305. In some embodiments, message store 1308 is implemented such that an identical message intended for two different mobile devices need only be stored once. The messages of message store 1308 may, according to some embodiments, be optimized and/or compressed to reduce a number of stored messages, a size of the stored messages, a number of messages transmitted to mobile devices, and/or a size of the messages transmitted to mobile devices.

Requests for synchronizations and transmission of messages from message store 1308 are handled by extract module 1309. Data handler 1310 initially receives synchronization requests from mobile devices 140 through 170. Data handler 1310 may also receive new or updated BO instances from mobile devices 140 through 170 for storage in back-end 110. Since conflicts can occur in any environment that permits concurrent updates to the same data from multiple devices, such BO instances are verified by conflict detection module 1311 using any suitable conflict detection and resolution protocol.

For example, an update conflict may be detected when two mobile devices attempt to update the same BO instance at nearly the same time. A uniqueness conflict may be detected if two devices each transmit a new BO instance having the same primary key value. Moreover, a delete conflict may occur when one device attempts to delete a BO instance and another device attempts to update or delete the BO instance.

Figure 3:
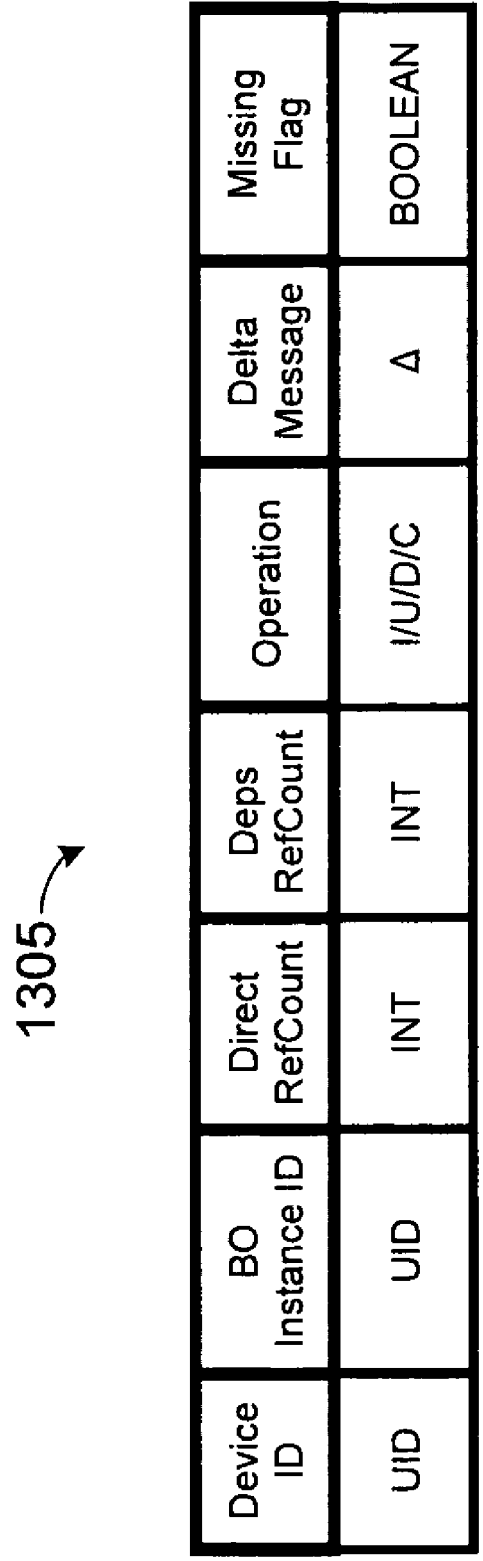
FIG. 3 is a tabular representation of a portion of an association table data structure according to some embodiments.

FIG. 3 illustrates a tabular representation of association table data structure 1305 according to some embodiments. Although referred to as a "table" herein, association table 1305 may comprise any type of data structure for associating two or more data values. In the examples below, two or more data values illustrated in a single "record" of association table 1305 will be considered associated with one another. Accordingly, each "record" of association table 1305 represents a group of associated data values.

The FIG. 3 representation shows seven fields as well as the types of data that may populate each. The Device ID field indicates a mobile device that is associated with the BO instance identified by the BO instance ID field. The BO instance ID may refer to a structure of consolidated data store 1303 that holds data of the BO instance. Each of the two ID fields of table 1305 may be populated with a "UID" variable type.

The Direct RefCount field indicates a reference count contributed by direct subscriptions to the BO instance by the mobile device. Conversely, the Deps RefCount field indicates a reference count contributed by dependent (indirect) subscriptions to the BO instance by the mobile device. Usage of the RefCount fields according to some embodiments will be described below.

The Operation field indicates a state associated with the BO instance and the mobile device. Possible values include "insert", "update", "delete", and "current". According to some embodiments, an "insert" state indicates that a full-state message of the BO instance will be transmitted to the mobile device at a next synchronization, an "update" state indicates that an update message to update some or all values of the BO instance on the mobile device will be transmitted to the mobile device at a-next synchronization, a "delete" state indicates that an instruction to delete the BO instance from the device will be transmitted to the mobile device at a next synchronization, and a "current" state indicates that no operation is to be performed at a next synchronization because the device stores the current state of the BO instance.

With reference to the above "insert" and "update" states, the Delta Message field indicates a reference to a full-state message within message store 130 or specific fields of the BO instance to update. The specific fields may be indicated by a bitmask and the updated values of the fields may also be,stored in message store 1308.

The Missing Flag field indicates whether the BO instance associated with the BO instance ID is missing from middleware 130. For example, a Missing Flag of TRUE may indicate that middleware 130 does not include the BO instance.

Figure 4:
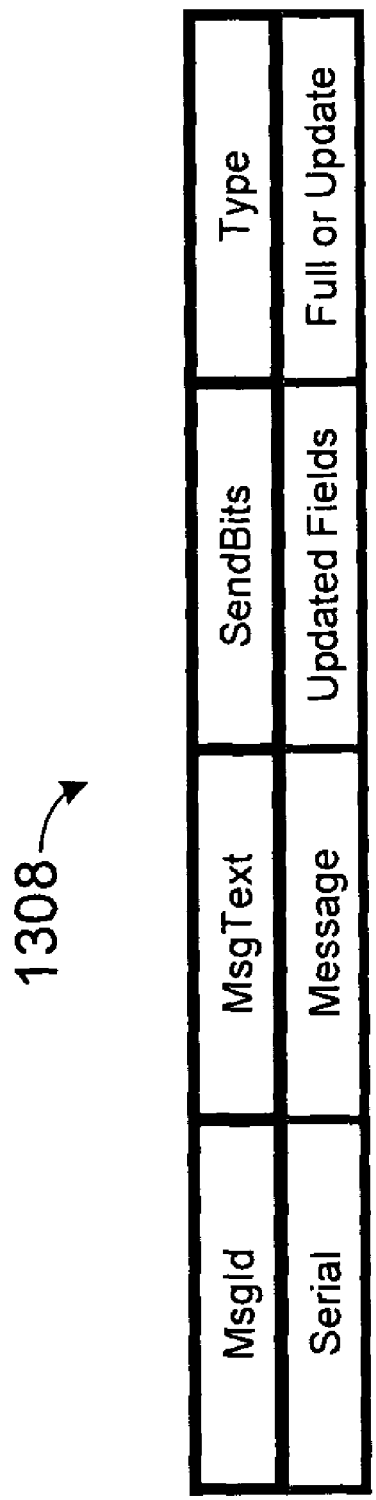
FIG. 4 is a tabular representation of a portion of a message store data structure according to some embodiments.

FIG. 4 illustrates a tabular representation of message store 1308 according to some embodiments. Message store 1308 may comprise any type of data structure for associating Message IDs with message text.

The MsgId field may include serial Message IDs that are sequentially-created each time a new "record" of message store 1308 is created. The MsgText field includes a message to be transmitted to an appropriate one or more mobile devices based on association table 1305. If the message is an update (rather than a full-state message used during an "insert" operation), the SendBits field marks the fields of an associated BO instance that are to be updated per the MsgText field. The Type field further indicates whether the message is a full-state or update message.

Figure 5:
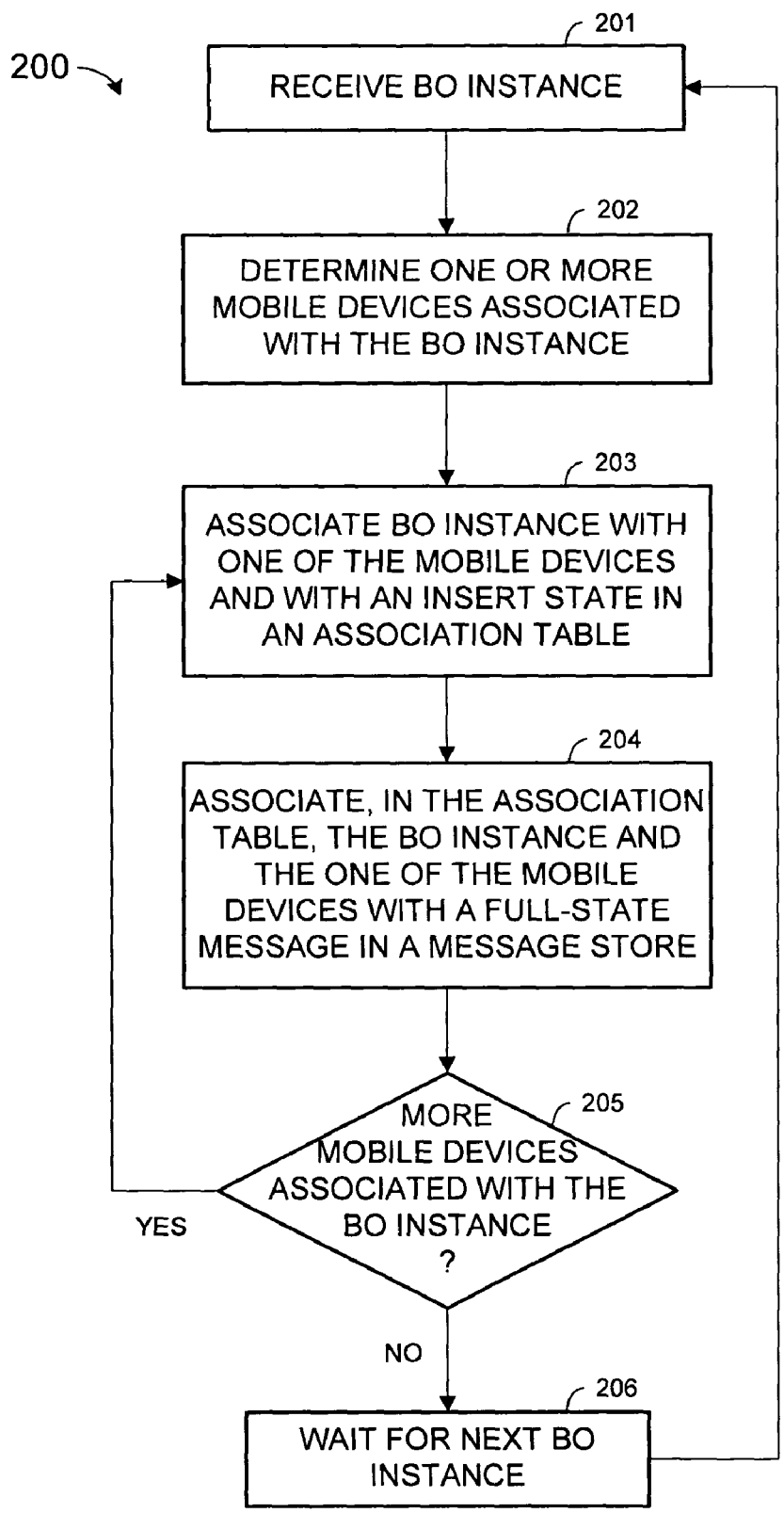
FIG. 5 is a flow diagram of process steps to populate an association table according to some embodiments.

FIG. 5 is a flow diagram of process 200 to populate an association table according to some embodiments. Process 200, as well as the other processes illustrated herein, may be performed by any combination of hardware, software, and firmware. These processes will be described below as if executed by middleware 130 of FIG. 2, but embodiments are not limited thereto.

A BO instance is initially received at 201. The BO instance may be received from back-end 110 by incoming message processing module 1301. Next, at 202, one or more mobile devices associated with the BO instance are determined. Realignment module 1304 may determine the one or more mobile devices based data associated with the BO instance itself and publications/subscriptions data 1302. Generally, one or more mobile devices subscribing to the particular BO instance may be determined at 202.

Realignment module 1304 may then associate the BO instance with one of the mobile devices and with an insert state in association table 1305 at 203. In some examples of 203, a new record of table 1305 is created including a Device ID of the mobile device, a BO Instance ID of the received BO instance, an insert state in the Operation field, and a Missing Flag of FALSE.

The association table is then used at 204 to associate the BO instance and the mobile device with a full-state message in message store 1308. According to some examples, the full-state message may be stored in association with a MsgID in store 1308, and the MsgID may be stored the Delta Message field of the association table record created at 203.

Flow cycles through 203 and 205 as long as it is determined at 205 that more mobile devices are associated with the BO instance. As a result, a record of association table 1305 is created for every mobile device determined at 202. Next, flow pauses at 206 to wait for reception of a next BO instance.

Figure 6:
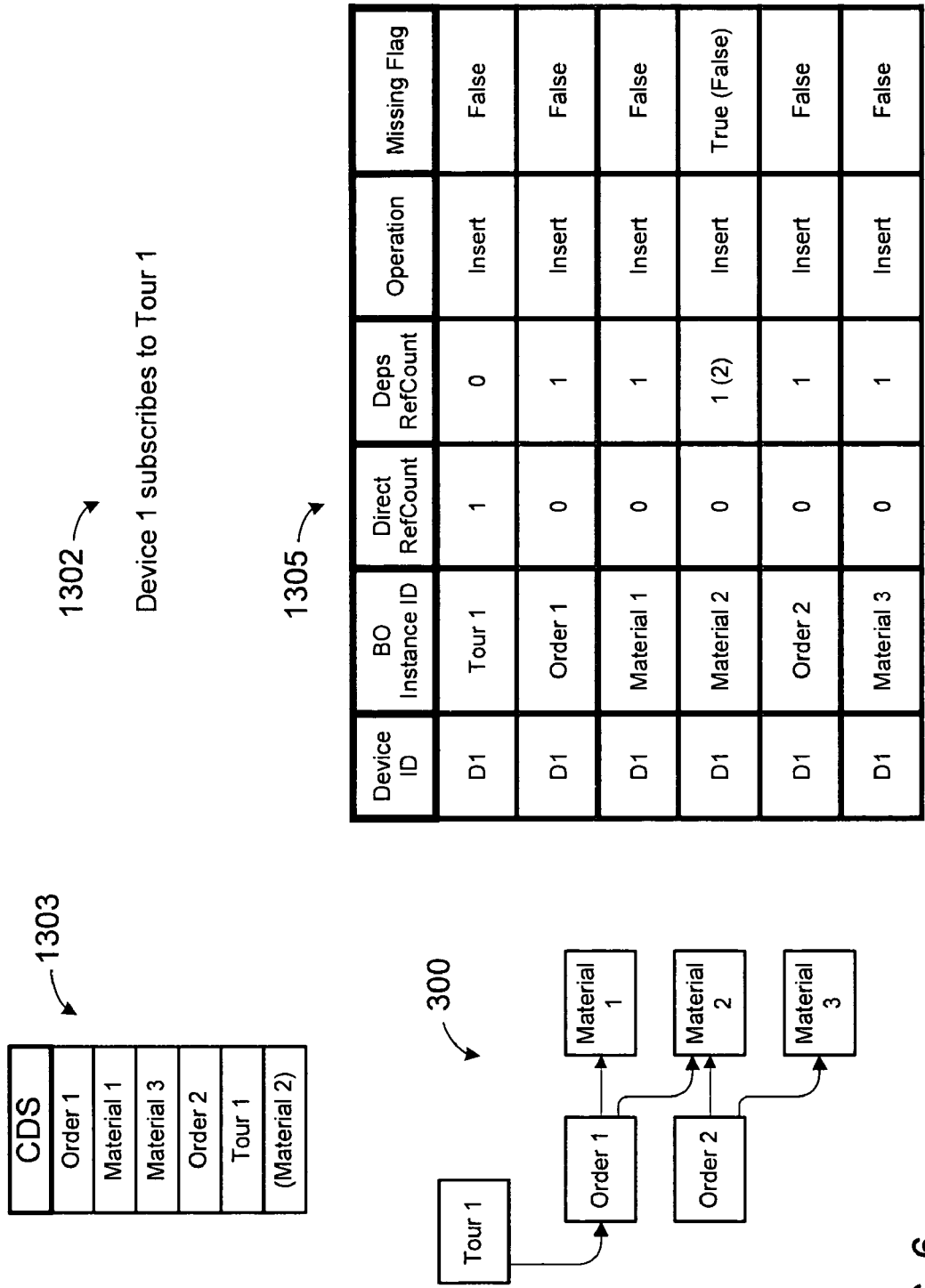
FIG. 6 illustrates consolidated data store records, an association table, and a business object hierarchy according to some embodiments.

FIG. 6 illustrates process 200 according to some embodiments. FIG. 6 includes a representation of consolidated data store 1303, publications/subscriptions data 1302, and association table 1305. Also shown is BO hierarchy 300.

Consolidated data store 1303 shows BO instances received by middleware 130. The Material 2 BO instance is shown in parentheses to indicate that this instance will be received later than the other illustrated BO instances. In accordance with some embodiments of process 200, data 1302 is used to determine that Device 1 (D1) is associated with each initially-received BO instance. Although data 1302 only indicates a subscription to BO instance Tour 1, such a subscription indicates an association between Device 1 and any BO instances that depend from BO instance Tour 1.

Accordingly, a record of association table 1305 is created for each BO instance in object hierarchy 300. The record associated with BO instance Tour 1 includes a Direct RefCount value of 1 and Deps RefCount value of 0 while each other record initially includes a Direct RefCount value of 0 and Deps RefCount value of 1. Also, in accordance with process 200, each record is associated with an "insert" state. The record associated with BO instance Material 2 is initially associated with a TRUE Missing Flag because the BO instance is initially not received by middleware 130. The Missing Flag is changed from TRUE to FALSE after middleware 130 receives the BO instance Material 2.

Realignment module 1304 may recursively traverse object hierarchy 300 to determine the Deps RefCount for the records of association table 1305. As shown, such recursion indicates that BO instance Material 2 depends from two BO instances.

As a result, the Deps RefCount associated with BO instance Material 2 is increased from 1 to 2.

Figure 7:
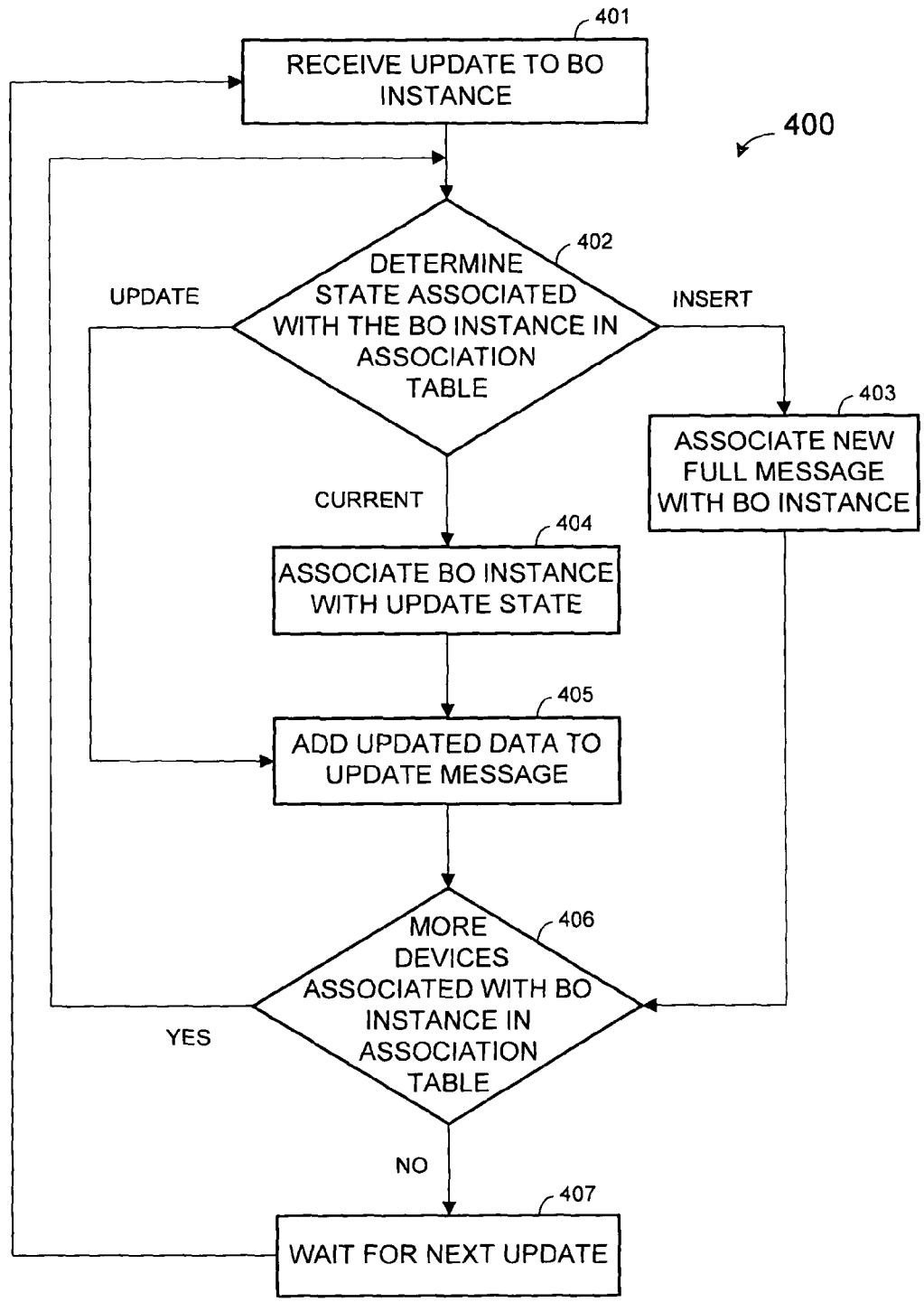
FIG. 7 is a flow diagram of process steps to update an association table data structure according to some embodiments.

FIG. 7 is a flow diagram of process 400 to update an association table based on an updated BO instance according to some embodiments. The updated BO instance is initially received at 401. The update may be received from back-end 110 by incoming message processing module 1301. Next, at 402, realignment module 1304 may determine a state associated with the BO instance in association table 1305.

FIGS. 8A and 8B illustrate tabular portions of association table 1305 for purposes of describing process 400 according to some embodiments. Association table 1305 of FIG. 8A may represent an association table prior to updates to BO instances I2, I3 and I4, while association table 1305 of FIG. 8B may represent association table 1305 of FIG. 8A after such updates.

It will first be assumed that the update received at 401 was an update to BO instance I2, and the update consisted of changing field "B" to value "3". Next, it is determined at 402 that the only state associated with BO instance I2 in FIG. 8A is the insert state. Following the "insert" path from 402, a new full-state message is associated with BO instance I2 at 403. As shown in FIG. 8B, the association at 403 does not change association table 1305, because the new full-state message is represented in message store 1308 and/or consolidated data store 1303. No further devices are associated with BO instance I2 in the FIG. 8A table, so flow proceeds from 406 to 407.

Continuing the present example, flow returns to 401 to receive an update to BO instance I3, the update consisting of changing field "B" to value "2". At 402, it is determined that the current state is associated with BO instance I3 (and device D1) in FIG. 8A. Following the "current" path from 402, the BO instance I3 is associated with the update state at 404, and the updated data is added to an update message associated with the BO instance I3 at 405. Such a change is reflected in the D1, I3 record of FIG. 8B.

Next, at 406, it is determined that another device (D2) is associated with BO instance I3 in the FIG. 8A table. Flow therefore returns through 402, 404 and 405 as described above, since the subject record of the FIG. 8A table is also associated with the current state. Flow then proceeds from 406 to 407 because no further devices are associated with BO instance I3 in the FIG. 8A table.

Flow again returns to 401 to receive an update to BO instance I4. The update consists of changing field "C" to value "5". At 402, it is determined that is BO instance I4 (and device D1) is associated with the current state in FIG. 8A. Again following the "current" path from 402, the BO instance I4 is associated with the update state at 404, and the updated data is added to an update message associated with the BO instance I4 at 405. These changes are reflected in the D1, I4 record of FIG. 8B.

Next, at 406, it is determined that another device (D2) is associated with BO instance I4 in the FIG. 8A table. However, this device and BO instance are associated with the update state. Flow therefore passes from 402 directly to 405 to add the updated data to the update message already in the FIG. 8A table. This update is reflected in the D2, I4 record of association table 1305 of FIG. 8B. Flow then proceeds from 406 to 407 because no further devices are associated with BO instance I4 in the FIG. 8A table.

Figure 9:
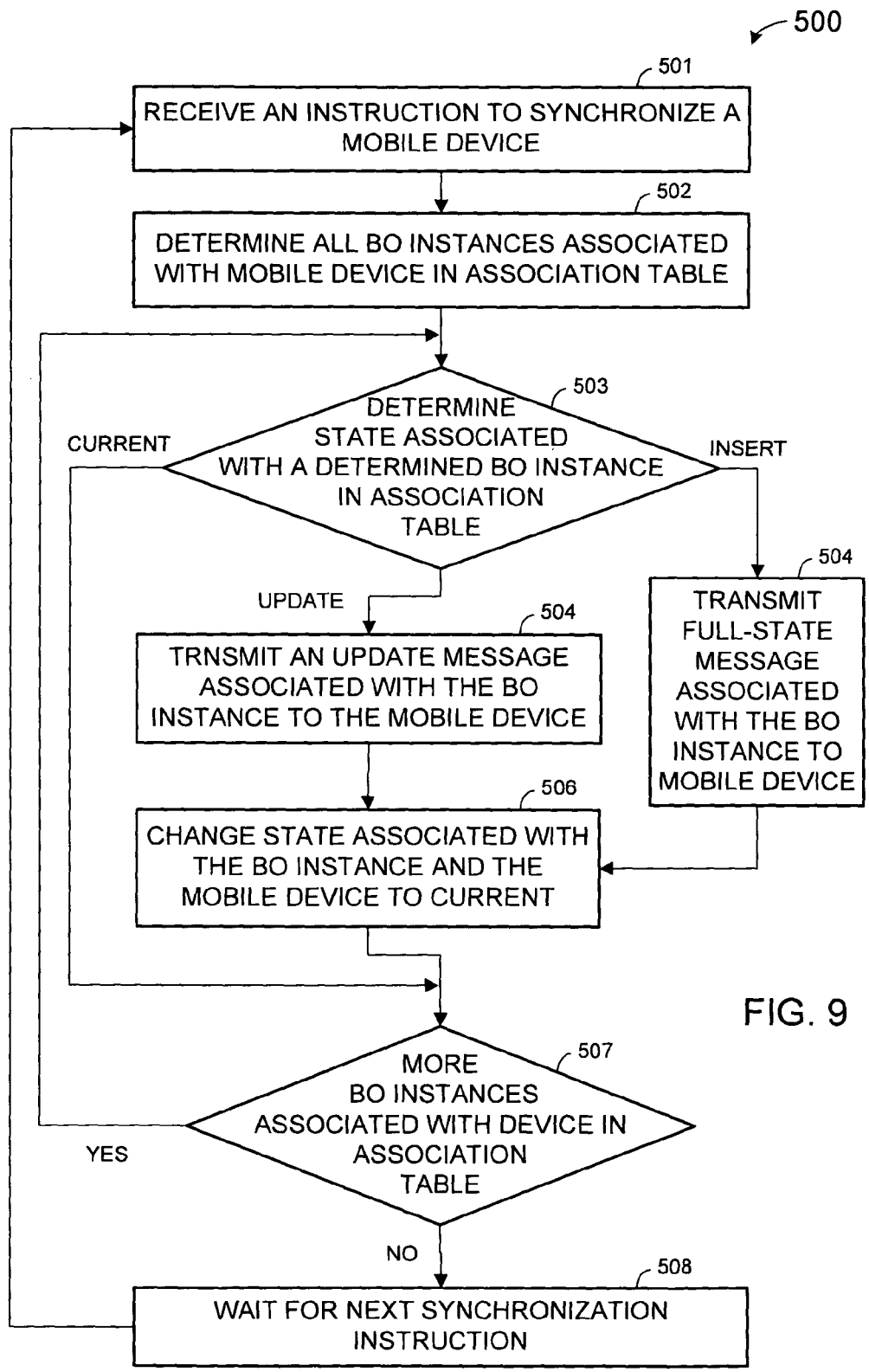
FIG. 9 is a flow diagram of process steps to synchronize a mobile device according to some embodiments.

FIG. 9 illustrates a flow diagram of process 500 to synchronize a mobile device according to some-embodiments. Process 500 will be described with respect to FIGS. 10 and 11. FIG. 10 illustrates a portion of association table 1305 associated with device D1 prior to process 500, and FIG. 11 illustrates a portion of association table 1305 associated with device D1 after process 500.

At 501, an instruction is received to synchronize a mobile device. The instruction may be received by data handler 1310 from mobile device D1 and passed to extract module 1309. All BO instances associated with the mobile device are then determined at 502. As mentioned above, FIG. 10 illustrates all BO instances associated with device D1 in association table 1305.

A state associated with one of the BO instances is determined at 503. In the present example, an insert state is initially determined to be associated with BO instance I4 at 503. Accordingly, at 504, a full-state message associated with BO instance I4 is transmitted to mobile device D1. The full-state message may be associated with BO instance I4 in data store 1303 and/or in message store 1308 via a reference in an associated Delta Message field (not shown) of the D1, I4 record of table 1305. Next, at 506, a state associated with BO instance I4 and device D1 is changed to current. Association table 1305 of FIG. 11 reflects this change. Flow returns to 503 from 507 because more BO instances are associated with device D1 in association table 1305.

According to the present example, it will be assumed that BO instances associated with the insert state will initially be determined at 503. Therefore, BO instance I5 is next determined to be associated with an insert state at 503. At 504, a full-state message associated with BO instance I5 is transmitted to mobile device D1, and a state associated with BO instance I5 and device D1 is changed to current at 506. The above process repeats for BO instance I8. In addition to the change to the D1, I4 data record mentioned above, FIG. 11 reflects the foregoing changes to the D1, I5 and D1, I8 data records of association table 1305.

Flow again returns to 503 from 507 because more BO instances are associated with device D1 in association table 1305. Process 500 shows that, for BO instances associated with a current state, no action is taken and flow simply proceeds to 507 to determine if more BO instances exist.

BO instance I2 is determined to be associated with an update state at some iteration of 503. As shown, an update message associated with BO instance I2 is transmitted to device D1 at 505. The update message may be stored in association 1305 and/or in message store 1308 as described above. The state associated with BO instance I2 is then changed to current at 506 and flow continues to 507. Flow proceeds to 508 from 507 if all BO instances have been determined at 503.

FIG. 11 illustrates records of association table 1305 after synchronization of device D1. The foregoing description of process 500 did not mention BO instance I7, which was associated with a remove state in FIG. 10. According to some embodiments of process 500, a message is transmitted to the synchronizing device to delete all BO instances that are associated with a remove state. Corresponding records of association table 1305 are also removed, as reflected in FIG. 11.

Figure 12:
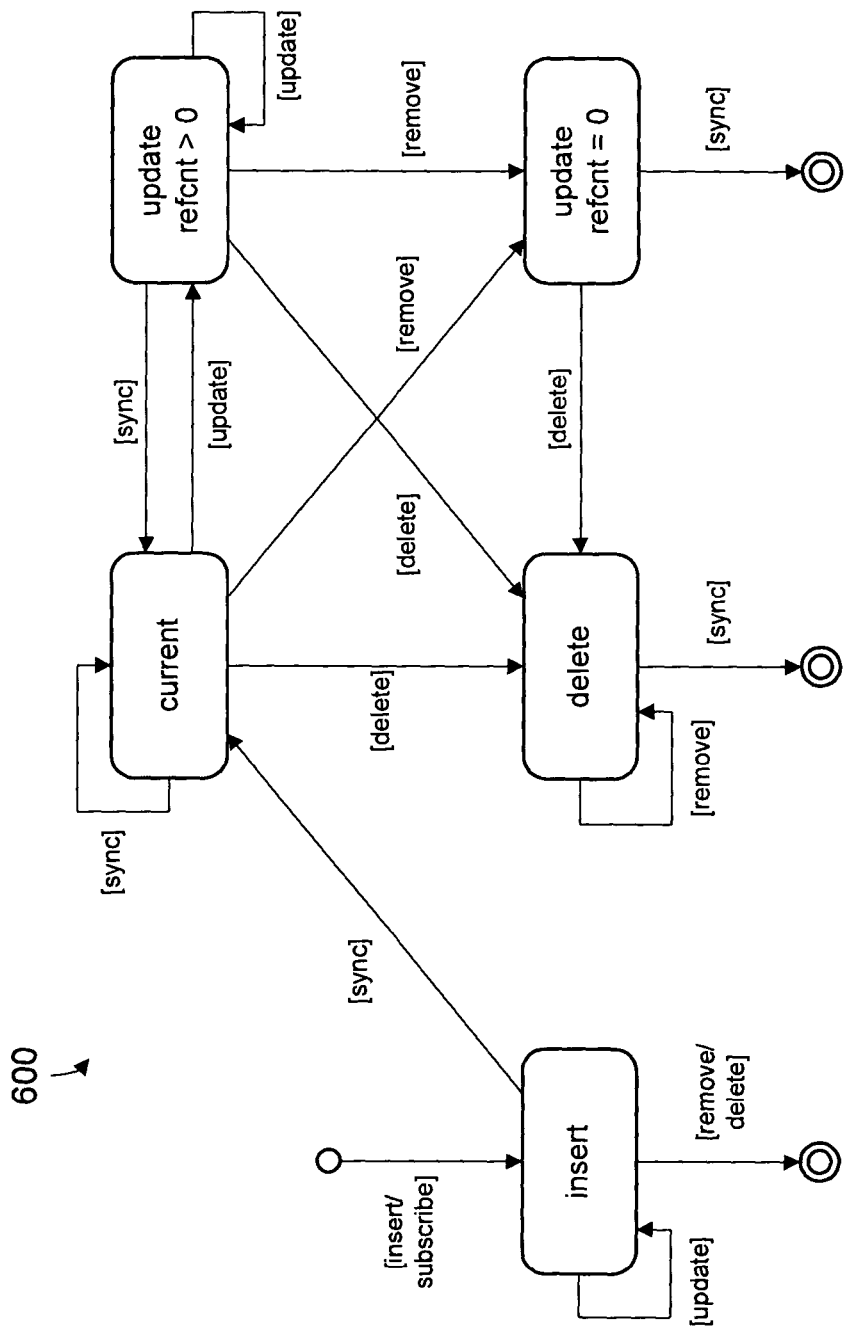
FIG. 12 is a state transition diagram for a business object instance in an association table according to some embodiments.

FIG. 12 is a state transition diagram for a single BO instance in an association table according to some embodiments. Diagram 600 reflects many aspects of the processes described above. The insert state is initially entered when a BO instance is associated with a mobile device by a corresponding record of an association table. The final state represents removal of the record from the association table.

Figure 13:
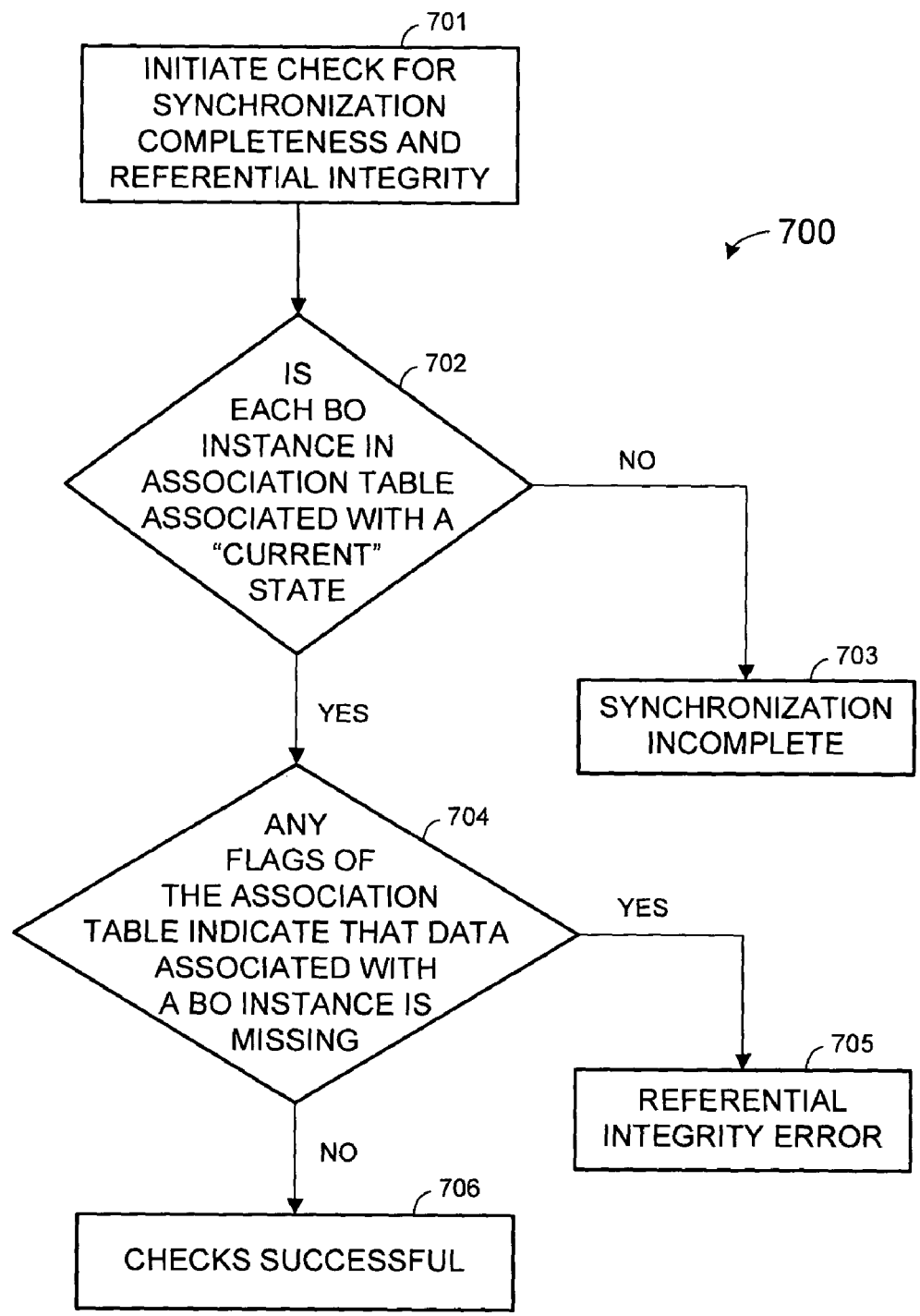
FIG. 13 is a flow diagram of process steps to perform referential integrity and synchronization completeness checks according to some embodiments.

FIGS. 13 through 19B illustrate some potentially beneficial management functions that may be provided by an association table as described herein. FIG. 13, for example, is a flow diagram of process 700 to perform a synchronization completeness check and a referential integrity check according to some embodiments.

Such a check is initiated at 701 and, at 702, it is determined if each BO instance in an association table is associated with the current state. FIG. 14A is a representation of association table 1305 to provide an illustration of the determination at 702. As shown, the D2, I4 record is associated with an insert state rather than a current state. Accordingly, synchronization is determined to be incomplete at 703. It should be noted that synchronization is complete for device D1 as represented in FIG. 14A.

FIG. 14B illustrates association table 1305 in which all BO instances are associated with a current state. If applying process 700 to association table 1305 of FIG. 14B, flow would therefore proceed from 702 to 704. At 704, it is determined whether any flags of the association table indicate that data associated with a BO instance is missing. This determination is affirmative in the case of association table 1305 of FIG. 14B (e.g., the D2, I5 record), so a referential integrity error is noted at 705. In contrast, the checks are deemed successful at 706 if the determination at 704 is negative.

In some embodiments of 700, the referential integrity check is performed before the synchronization completeness check. Some embodiments perform these checks independently of one another, and/or with respect to specific mobile devices rather than with respect to an entire association table.

Figure 15:
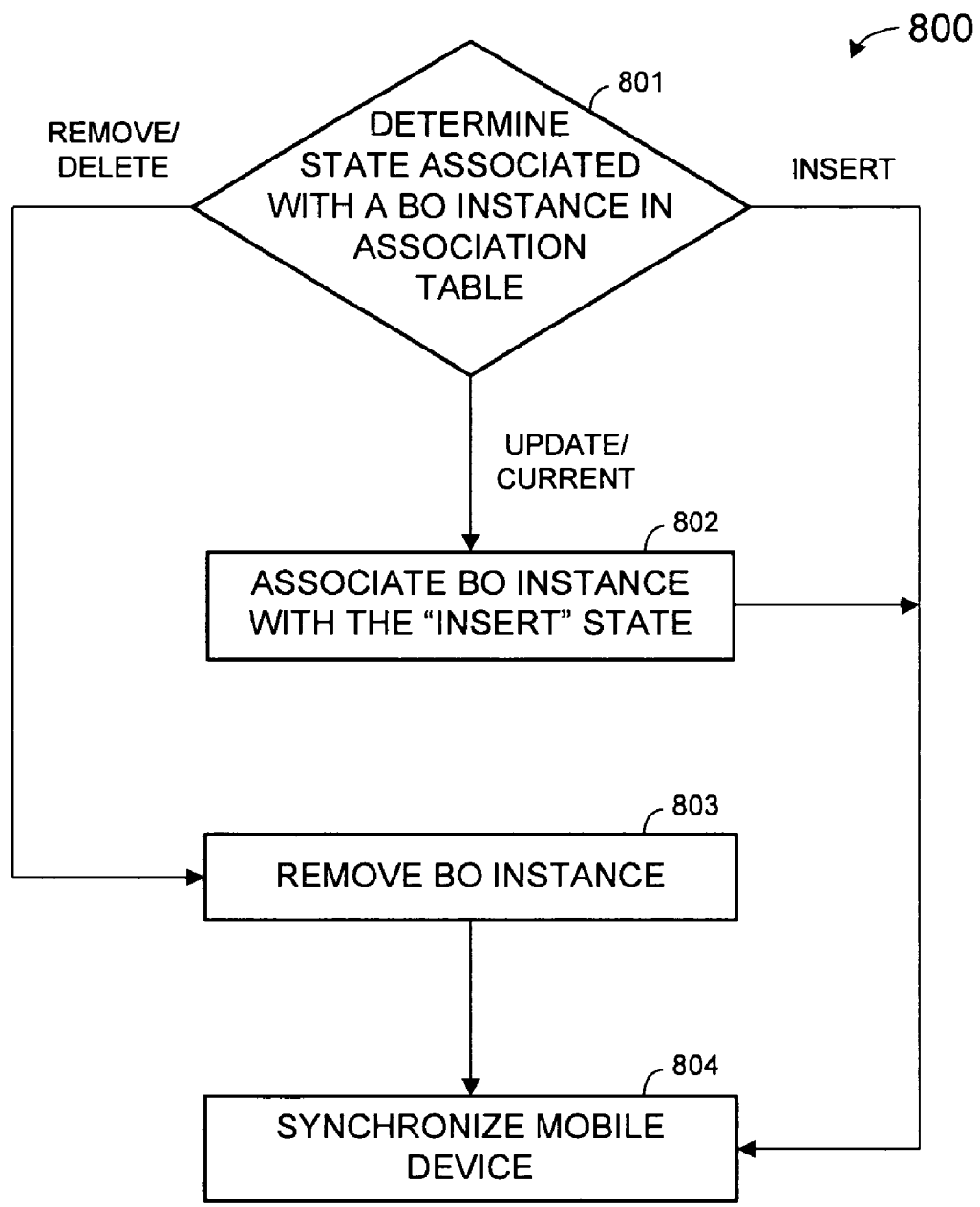
FIG. 15 is a flow diagram of process steps to regenerate data on a mobile device according to some embodiments.

FIG. 15 illustrates process 800 to regenerate data stored on a mobile device. Such regeneration may be used to replace a lost device or to reload corrupted or otherwise faulty data on a device. FIG. 16A illustrates a portion of association table 1305 associated with the device prior to regeneration, and FIG. 16B illustrates a portion of association table 1305 associated with the device after regeneration.

States associated with each BO instance that is associated with the device are determined from association table 1305 at 801. BO instances associated with the update state or the current state are associated with the insert state in association table 1305 at 802. BO instances associated with the remove state or the delete state are removed from association table 1305 at 803. Such associations and removals are reflected in table 1305 of FIG. 16B.

The mobile device is then synchronized at 804 based on table 1305 of FIG. 16B. As described with respect to process 500, full-state messages associated with each BO instance of table 1305 will be transmitted to the mobile device during synchronization, thereby regenerating each BO instance on the mobile device.

Figure 17:
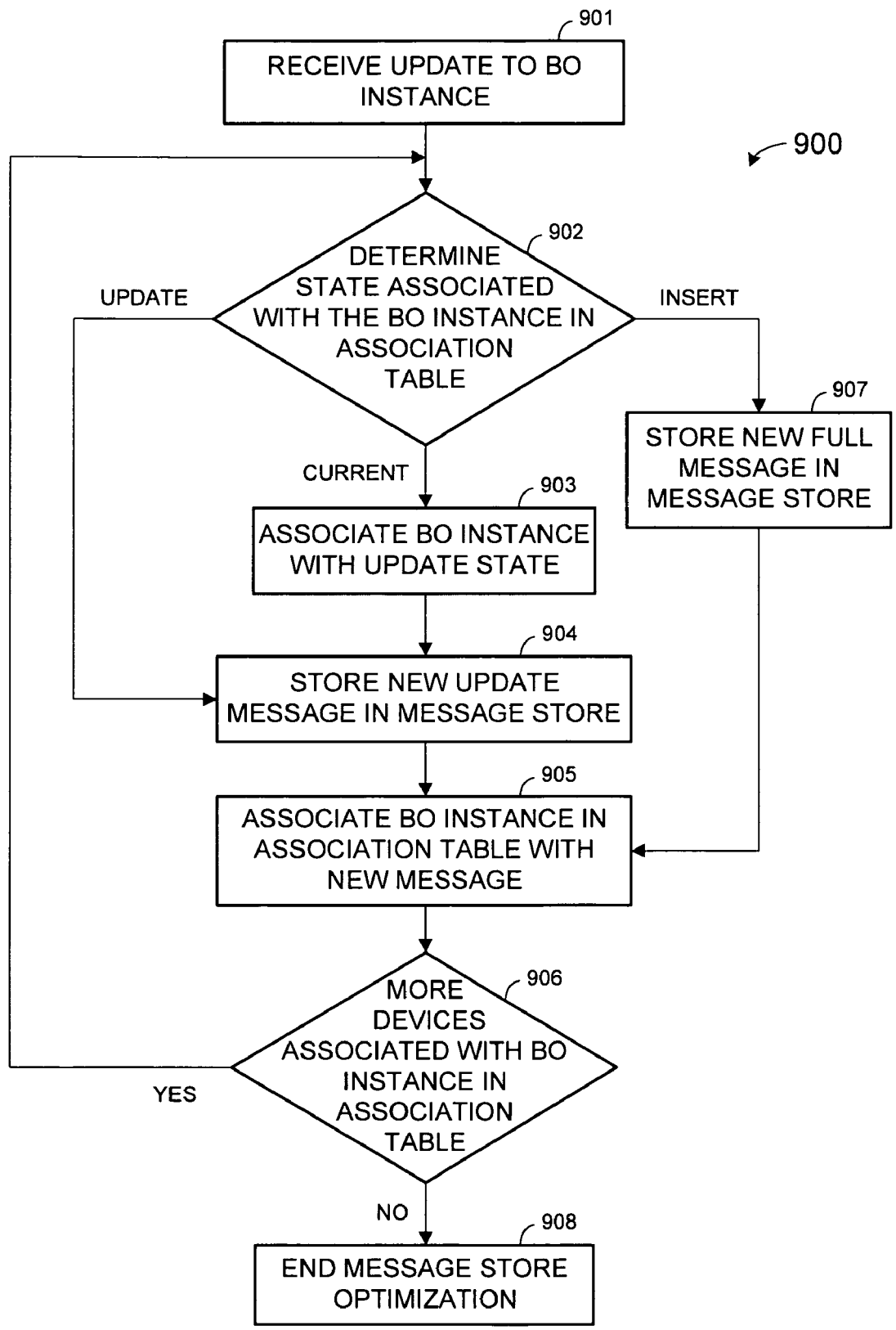
FIG. 17 is a flow diagram of process steps to optimize a message store according to some embodiments.

FIG. 17 is a flow diagram of process 900 to optimize a message store based on receipt of an updated BO instance according to some embodiments. The updated BO instance may be received at 901 from back-end 110 by incoming message processing module 1301.

FIGS. 18A and 18B illustrate tabular portions of message store 1308 and association table 1305, respectively, for providing an example of process 900 according to some embodiments. Message store 1308 and association table 1305 of FIGS. 18A and 18B may represent a period prior to receipt of an update at 901.

According to the example, the received update updates field "B" of BO instance O1 to "4". Association table 1305 of FIG. 18B shows five records (and, therefore five states) associated with BO instance O1. One of the associated states is determined at 902. It will be assumed that the current state associated with BO instance O1 in the D3, O1 record is initially determined at 902.

Accordingly, the BO instance O1 is associated with the update state at 903, and a corresponding new update message is stored in message store 1308 at 904. The BO instance O1 is then associated with the new update message in association table 1305 at 905.

FIGS. 19A and 19B illustrate tabular portions of message store 1308 and association table 1305, respectively, after completion of process 900 according to some embodiments. Accordingly, message store 1308 and association table 1305 of FIGS. 19A and 19B illustrate the changes described above with respect to 903, 904 and 905. Specifically, the BO instance O1 in the D3, O1 record has been associated with the update state, a corresponding new update message is stored in message store 1308, and the BO instance O1 in the D3, O1 record is associated with the new update message in association table 1305 via the Delta (i.e. MsgID) "5".

Next, at 906, it is determined that other devices are associated with BO instance O1 in the FIG. 18B table. Flow therefore returns to 902, where the insert state associated with BO instance O1 in the D1, O1 record is determined. Accordingly, a corresponding new full-state message is stored in message store 1308 at 907, and the BO instance O1 is associated with the new full-state message in association table 1305 at 905. Again, these changes are illustrated by message store 1308 and association table 1305 of FIGS. 19A and 19B. In particular, a new full-state message is stored in message store 1308, and the BO instance O1 in the D1, O1 record is associated with the new full-state message in association table 1305 via the Delta (i.e. MsgID) "6".

It is again determined at 906 that other devices are associated with BO instance O1 in the FIG. 18B table. The update state associated with BO instance O1 in the D2, O1 record is then determined at 902. Accordingly, a corresponding new update message is stored in message store 1308 at 904, and the BO instance O1 is associated with the new update message in association table 1305 at 905 via Delta (MsgID) "7". The new update message updates a previous update message that was stored in message store 1308 and associated with BO instance O1 in the D2, O1 record via Delta (MsgID) "3".

The foregoing flow through 902, 904 and 905 then repeats twice for BO instance O1 in the D4, O1 record and the D5, 01 record. In these cases, the new update message stored in message store 1308 updates a previous update message that was stored in message store 1308 and associated-with BO instance O1 in each record via Delta (MsgID) "4". Also, the BO instance O1 of each record is associated with the new update message in association table 1305 at 905 via Delta (MsgID) "8".

Flow then proceeds from 906 to 908 because no further devices are associated with BO instance O1 in association table 1305. In some embodiments, process 900 improves maintenance of message store 1308 by allowing periodic purging of all messages associated with MsgID that is less than a lowest Delta of association table 1305.

The embodiments described herein are solely for the purpose of illustration. Those in the art will recognize that other embodiments may be practiced with modifications and alterations.

What is claimed is:

1. A method comprising:
   receiving, from a backend system by middleware, a business object instance;
   determining, by the middleware, one or more mobile devices associated with the business object instance, the one or more mobile devices not being continuously connected in communication with the backend system;

associating, by the middleware, the business object instance with the one or more mobile devices and with an insert state in an association table, the insert state indicating a full-state message of the business object instance is to be transmitted to the one or more mobile devices upon a synchronization of the one or more mobile devices and the full-state message being a complete instantiation of the business object;

associating, in the association table by the middleware, the business object instance and the one or more mobile devices with a full-state message in a message store;

receiving, by the middleware from one of the one or more mobile devices, an instruction to synchronize the back end system with the one of the one or more mobile devices; and for each business object instance associated with the one of the one or more mobile devices in the association table:
- determining, by the middleware, a state associated with the business object instance and with the one of the one or more mobile devices in the association table;
- in an instance it is determined the insert state is associated with the one of the one or more mobile devices and the business object instance in the association table, transmitting the full-state message associated with the one of the one or more mobile devices and the business object instance to the one of the one or more mobile devices; and
- in an instance it is determined an update state is associated with the one of the one or more mobile devices and the business object instance in the association table, transmitting an update message associated with the business object instance and the one of the one or more mobile devices to the one of the one or more mobile devices.

2. The method according to Claim 1, further comprising:
storing, by the middleware, a message identifier in the association table;
storing, by the middleware, the message identifier in the message store; and
associating, by the middleware, the full-state message with the message identifier in the message store.

3. The method according to claim 1, further comprising:
receiving, by the middleware, an update to the business object instance;
determining, by the middleware, a second one or more mobile devices associated with the business object instance; and
for each one of the second one or more mobile devices:
- determining, by the middleware, a state associated with the business object instance and with the one of the second one or more mobile devices in the association table;
- an instance the business object instance and the one of the second one or more mobile devices are associated with a current state in the association table, associating the business object instance and the one of the second one or more mobile devices with an update state and an update message data in the association table;
- an instance the business object instance and the one of the second one or more mobile devices are associated with the update state in the association table, associating the business object instance and the one of the second one or more mobile devices with the update message data in the association table; and
- an instance the business object instance and the one of the second one or more mobile devices are associated with the insert state in the association table, associating, in the association table, the business object instance and the one of the second one or more mobile devices with a new full-state message of the message store.

4. The method according to claim 3, further comprising:
receiving, by the middleware, an instruction to synchronize with one of the second one or more mobile devices; and
for each business object instance associated with the one of the second one or more mobile devices in the association table:
- determining, by the middleware, a state associated with the business object instance and with the one of the second one or more mobile devices in the association table;
- an instance the insert state is associated with the one of the second one or more mobile devices and the business object instance in the association table, transmitting the new full-state message to the one of the second one or more mobile devices; and
- an instance the update state is associated with the one of the second one or more mobile devices and the business object instance in the association table, transmitting the update message associated with the business object instance and the one of the second one or more mobile devices to the one of the second one or more mobile devices.

5. The method according to claim 1, further comprising:
receiving, by the middleware, an instruction to remove the business object instance from the one or more mobile devices;
associating, by the middleware, the business object instance and the one or more mobile devices with a remove state in the association table;
receiving, by the middleware from one of the one or more mobile devices, an instruction to synchronize with the one of the one or more mobile devices;
determining, by the middleware, that the one of the one or more mobile devices and the business object instance are associated with the remove state in the association table;
transmitting, from the middleware, an instruction to remove the business object instance from the one of the one or more mobile devices; and
removing, by the middleware, the association between the one of the one or more mobile devices and the business object instance from the association table.

6. The method according to claim 5, further comprising:
decrementing, by the middleware, a reference count associated with the business object instance and the one mobile device in the association table; and
removing, by the middleware, the association between the one mobile device and the business object instance from the association table if the reference count equals zero.

7. The method according to claim 1, further comprising:
associating, by the middleware, each business object instance of the association table with a respective flag, the flag to indicate whether data associated with a respective business object instance is missing from middleware; and
determining, by the middleware, whether any of the flags indicate that data associated with a respective business object instance is missing from middleware.

8. The method according to claim 1, further comprising:
regenerating, by the middleware, data for one of the one or more mobile devices by:
associating, by the middleware, all business object instances associated with the one of the one or more mobile devices and with the update state or a current state in the association table with the insert state; and removing, by the middleware, all business object instances associated with the one of the one or more mobile devices and with a remove state or a delete state in the association table.

9. The system comprising:

middleware comprising an association table and a message store, the middleware to:

receive a business object instance from a backend system;

determine one or more mobile devices associated with the business object instance, the one or more mobile devices not being continuously connected in communication with the backend system;

associate the business object instance with the one or more mobile devices and with an insert state in an association table, the insert state indicating a full-state message of the business object instance is to be transmitted to the one or more mobile devices upon a synchronization of the one or more mobile devices and the full-state message being a complete instantiation of the business object;

associate, in the association table, the business object instance and the one or more mobile devices with a full-state message in the message store;

receive from one of the one or more mobile devices, an instruction to synchronize the backend system with the one of the one or more mobile devices; and for each business object instance associated with the one of the one or more mobile devices in the association table:

determine a state associated with the business object instance and with the one of the one or more mobile devices in the association table;

in an instance it is determined the insert state is associated with the one of the one or more mobile devices and the business object instance in the association table, transmit the full-state message associated with the one of the one or more mobile devices and the business object instance to the one of the one or more mobile devices; and in an instance it is determined an update state is associated with the one of the one or more mobile devices and the business object instance in the association table, transmit an update message associated with the business object instance and the one of the one or more mobile devices to the one of the one or more mobile devices.

10. The system according to Claim 9, the middleware further to:

store a message identifier in the association table;

store the message identifier in the message store; and associate the full-state message with the message identifier in the message store.

11. The system according to claim 9, the middleware further to:

receive an update to the business object instance;

determine a second one or more mobile devices associated with the business object instance; and for each one of the second one or more mobile devices:

determine a state associated with the business object instance and with the one of the second one or more mobile devices in the association table;

in an instance the business object instance and the one of the second one or more mobile devices are associated with a current state in the association table, associate the business object instance and the one of the second one or more mobile devices with an update state and an update message data in the association table;

in an instance the business object instance and the one of the second one or more mobile devices are associated with the update state in the association table, associate the business object instance and the one of the second one or more mobile devices with the update message data in the association table; and in an instance the business object instance and the one of the second one or more mobile devices are associated with the insert state in the association table, associate, in the association table ,the business object instance and the one of the second one or more mobile devices with a new full-state message of the message store.

12. The system according to claim 11, the middleware further to:

receive an instruction to synchronize with one of the second one or more mobile devices; and for each business object instance associated with the one of the second one or more mobile devices in the association table:

determine a state associated with the business object instance and with the one of the second one or more mobile devices in the association table;

in an instance the insert state is associated with the one of the second one or more mobile devices and the business object instance in the association table, transmit the new full-state message to the one of the second one or more mobile devices; and in an instance the update state is associated with the one of the second one or more mobile devices and the business object instance in the association table, transmit the update message associated with the business object instance and the one of the second one or more mobile devices to the one of the second one or more mobile devices.

13. The system according to claim 9, the middleware further to:

receive an instruction from the backend system to remove the business object instance from the one or more mobile devices;

associate the business object instance and the one or more mobile devices with a remove state in the association table;

receive a second instruction to synchronize with one of the one or more mobile devices;

determine that the one mobile device and the business object instance are associated with the remove state in the association table; and remove the association between the one mobile device and the business object instance from the association table.

14. The system according to claim 13, the middleware further to:

decrement a reference count associated with the business object instance and the one mobile device the association table; and remove the association between the one mobile device and the business object instance from the association table if the reference count equals zero.

15. The system according to claim 9, the middleware further to:

associate each business object instance of the association table with a respective flag, the flag to indicate whether data associated with a respective business object instance is missing from middleware; and determine whether any of the flags indicate that data associated with a respective business object instance is missing from middleware.

16. The system according to claim 9, the middleware further to:
regenerate data for one of the one or more mobile devices by:
association of all business object instances associated with the one mobile device and with the update state or a current state in the association table with the insert state; and
removal of all business object instances associated with the one of the one or more mobile devices and with a remove state or a delete state in the association table.

17. A computer-readable medium storing program code, the program code comprising:
code to receive a business object instance from a backend system by middleware;
code to determine, by the middleware, one or more mobile devices associated with the business object instance, the one or more mobile devices not being continuously connected in communication with the backend system;
code to associate, by the middleware, the business object instance with the one or more mobile devices and with an insert state in an association table, the insert state indicating a full-state message of the business object instance is to be transmitted to the one or more mobile devices upon a synchronization of the one or more mobile devices and the full-state message being a complete instantiation of the business object;
code to associate, by the middleware, in the association table, the business object instance and the one or more mobile devices with a full-state message in the message store;
code to receive, by the middleware, from one of the one or more mobile devices, an instruction to synchronize the backend system with the one of the one or more mobile devices; and
for each business object instance associated with the one of the one or more mobile devices in the association table:
code to determine, by the middleware, a state associated with the business object instance and with the one of the one or more mobile devices in the association table;
code to, in an instance it is determined the insert state is associated with the one of the one or more mobile devices and the business object instance in the association table, transmit the full-state message associated with the one of the one or more mobile devices and the business object instance to the one of the one or more mobile devices; and
code to, in an instance it is determined an update state is associated with the one of the one or more mobile devices and the business object instance in the association table, transmit an update message associated with the business object instance and the one of the one or more mobile devices to the one of the one or more mobile devices.

18. The computer-readable medium according to claim 17, the program code further comprising:
code to store, by the middleware, a message identifier in the association table;
code to store, by the middleware, the message identifier in the message store; and
code to associate, by the middleware, the full-state message with the message identifier in the message store.

19. The computer-readable medium according to claim 17, the program code further comprising:

code to receive, by the middleware, an update to the business object instance;
code to determine, by the middleware, a second one or more mobile devices associated with the business object instance; and
for each one of the second one or more mobile devices:
code to determine, by the middleware, a state associated with the business object instance and with the one of the second one or more mobile devices in the association table;
code to associate, in an instance the business object instance and the one of the second one or more mobile devices are associated with a current state in the association table, the business object instance and the one of the second one or more mobile devices with an update state and an update message data in the association table;
code to associate, in an instance the business object instance and the one of the second one or more mobile devices are associated with the update state in the association table, the business object instance and the one of the second one or more mobile devices with the update message data in the association table; and
code to associate in the association table, in an instance the business object instance and the one of the second one or more mobile devices are associated with the insert state in the association table, the business object instance and the one of the second one or more mobile devices with a new full-state message of the message store.

20. The computer-readable medium according to claim 19, the program code further comprising:
code to receive, by the middleware, an instruction to synchronize with one of the second one or more mobile devices; and
for each business object instance associated with the one of the second one or more mobile devices in the association table:
code to determine, by the middleware, a state associated with the business object instance and with the one of the second one or more mobile devices in the association table;
code to transmit, in an instance the insert state is associated with the one of the second one or more mobile devices and the business object instance in the association table, the new full-state message to the one of the second one or more mobile devices; and
code to transmit, in an instance the update state is associated with the one of the second one or more mobile devices and the business object instance in the association table, the update message associated with the business object instance and the one of the second one or more mobile devices to the one of the second one or more mobile devices.

21. The computer-readable medium according to claim 17, the program code further comprising:
code to receive, by the middleware, an instruction from the backend system to remove the business object instance from the one or more mobile devices;
code to associate, by the middleware, the business object instance and the one or more mobile devices with a remove state in the association table;
code to receive, by the middleware, a second instruction to synchronize with one of the one or more mobile devices;
code to determine, by the middleware, that the one mobile device and the business object instance are associated with the remove state in the association table; and code to remove, by the middleware, the association between the one mobile device and the business object instance from the association table.

22. The computer-readable medium according to claim 21, the program code further comprising:

code to decrement, by the middleware, a reference count associated with the business object instance and the one mobile device the association table; and code to remove, by the middleware, the association between the one mobile device and the business object instance from the association table if the reference count equals zero.

23. The computer-readable medium according to claim 17, the program code further comprising:

code to associate, by the middleware, each business object instance of the association table with a respective flag, the flag to indicate whether data associated with a respective business object instance is missing from middleware; and code to determine, by the middleware, whether any of the flags indicate that data associated with a respective business object instance is missing from middleware.

24. The computer-readable medium according to claim 17, the program code further comprising:

code to regenerate, by the middleware, data for one of the one or more mobile devices by associating all business object instances associated with the one mobile device and with the update state or a current state in the association table with the insert state, and removing all business object instances associated with the one of the one or more mobile devices and with a remove state or a delete state in the association table.

* * * * *